Dec. 31, 1963  S. V. ROBERTS ETAL  3,115,896
WATER TEMPERATURE SELECTOR VALVE
Filed Nov. 2, 1960  2 Sheets-Sheet 1
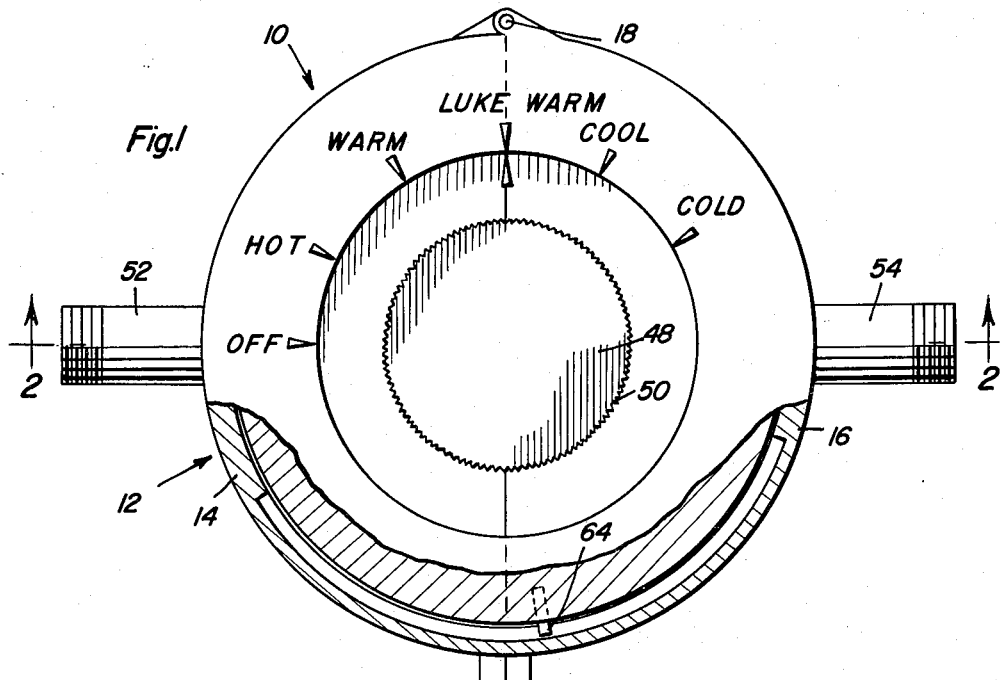
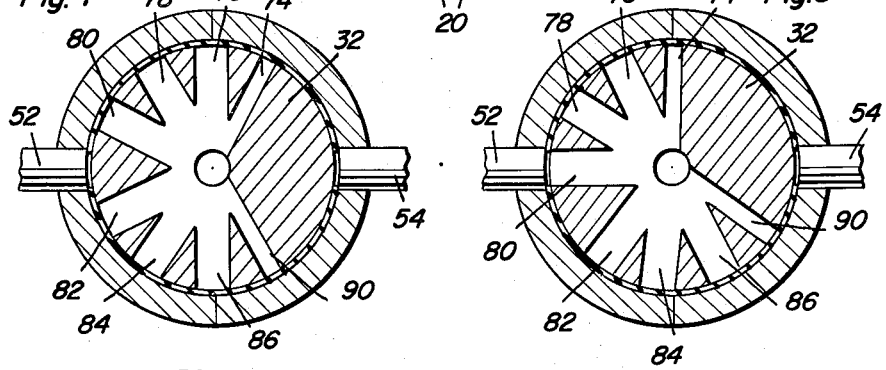
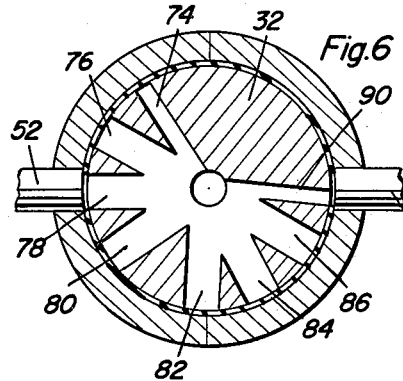
Sylvia V. Roberts
Robert D. Bassett
INVENTORS

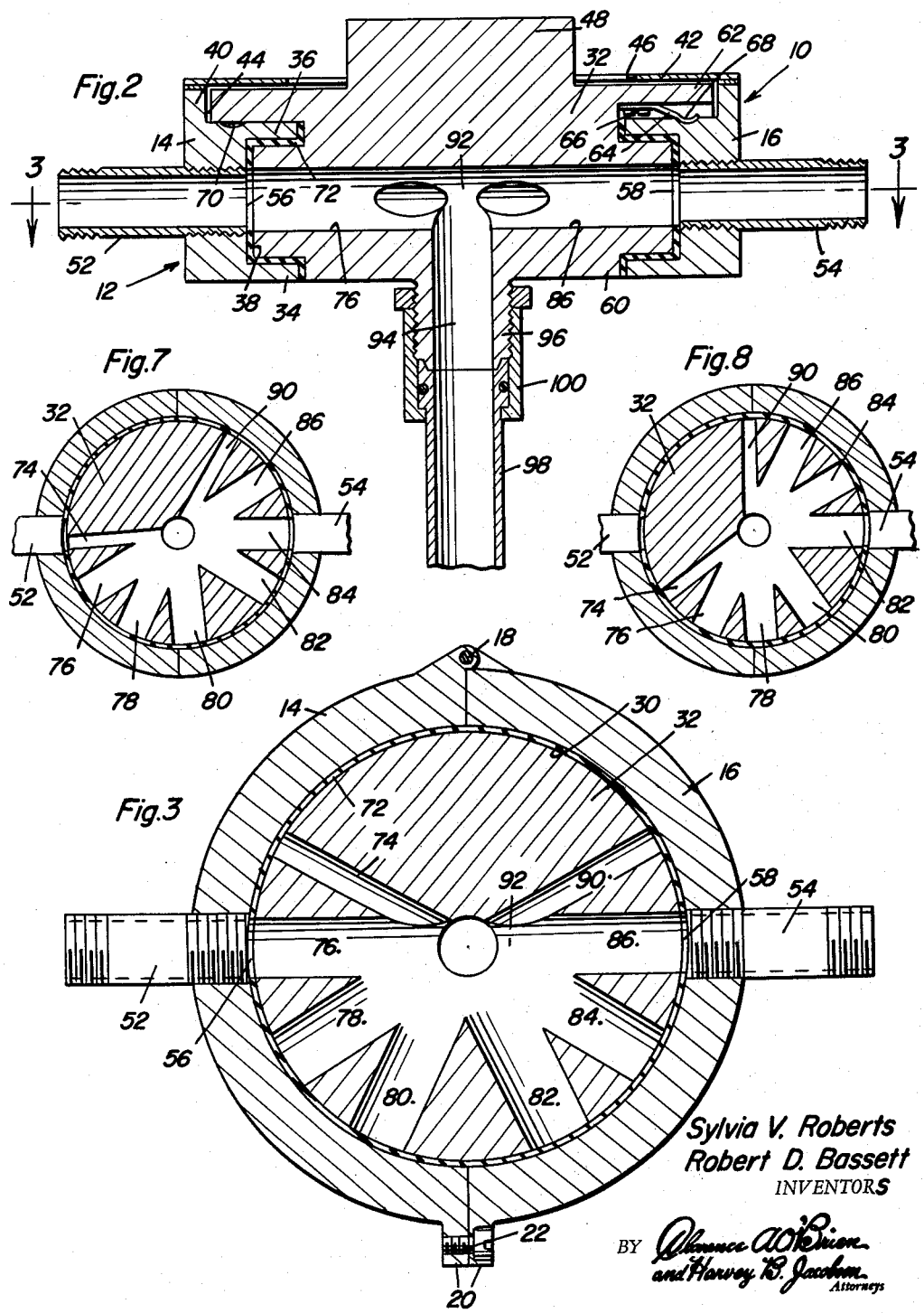

3,115,896
WATER TEMPERATURE SELECTOR VALVE
Sylvia V. Roberts, 13630 Paxton St., Pacoima, Calif., and Robert D. Bassett, Oxnard, Calif. (6724 Wynne Ave., Reseda, Calif.)
Filed Nov. 2, 1960, Ser. No. 66,719
8 Claims. (Cl. 137—625.41)

This invention comprises a novel and useful semi-automatic water temperature selector valve and more particularly relates to a manually adjustable valve capable of variably proportioning the mixing of hot and cold water whereby to produce a flow of water at any desired temperature.

The primary object of this invention is to produce a temperature controlled flow proportionate valve of a simple and durable construction which will enable the mixing of hot and cold water in any desired proportions to produce water of any selected temperature.

A further object of the inevntion is to provide a device in accordance with the preceding object wherein the valve casing shall be so constructed as to permit quick and easy access to the interior of the valve for the purpose of inspecting its various parts, replenishing the sealing means and the like.

A still further important object of the invention is to provide a flow proportioning valve in accordance with the above mentioned objects which shall eliminate the use of bimetallic or thermostatic elements and wherein a single moving part is utilized to obtain various mixtures of hot and cold water.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view, parts being broken away and shown in horizontal section of a suitable embodiment of a water temperature selector valve in accordance with this invention, the valve being positioned to produce an equal mixture of hot and cold water and thus obtain a lukewarm temperature of the water delivered therefrom;

FIGURE 2 is a vertical transverse sectional view taken substantially upon the plane indicated by section line 2—2 of FIGURE 1;

FIGURE 3 is a horizontal sectional view taken substantially upon the plane indicated by section line 3—3 of FIGURE 2; and FIGURES 4–8 are sectional views corresponding to that of FIGURE 3 but taken upon a reduced scale and showing different positions of adjustment of the valve for producing different temperatures of the water emitted from the valve.

Referring first to FIGURES 1–3, it will be observed that the water temperature selector valve of this invention designated generally by the numeral 10 includes an annular casing 12 of suitable material which is conveniently formed of two sections such as the sections 14 and 16 which are hingedly connected together as by a hinge or pivot pin 18 and that the opposite ends are provided with complementary lugs 20 together with a fastening screw 22 by means of which the casing sections are retained in their closed position. By this construction the casing can be opened or closed to enable ready access to the interior thereof for servicing, inspecting or repairing the valve body of the valve sealing means.

It will be observed that by its annular construction, the two casing sections define therebetween a cylindrical opening indicated by the numeral 30 and which thus defines a chamber in which is received a rotatable valve body 32.

Referring again to the casing structure it will be observed that the latter includes a pair of angularly inwardly directed flanges which as shown in FIGURE 2 may be designated as a bottom flange 34 and a top flange 36, the flanges thus defining therebetween a channel which has a concave bottom wall as at 38. It will be observed that the top flange 36 is spaced from the upper edge of the casing sections so that there arises from the top flange at the periphery thereof an annular rim as at 40. An annular inwardly directed cover flange 42 is secured in any suitable manner to the rim 40 and overlies the flange 36 to define therebetween an annular compartment of space 44. It will be understood that the cover flange 42 may consist of a one-piece annulus or ring or if desired could consist of two sections each corresponding to one of the casing sections 14 and 16. A central opening 46 is disposed in the cover flange and an axial projection 48 of the valve body extends upwardly therethrough to the exterior of the casing to provide a knob or finger-grip portion whose periphery may be knurled as shown at 50 in FIGURE 1 to facilitate rotational adjustment of the valve body.

Upon diametrically opposite sides of the casing there are provided a pair of nipples 52 and 54 which may respectively provide hot water inlet and cold water inlet means. The inner ends of these nipples in conjunction with the threaded bores in the casing sections into which they are secured provide hot and cold water inlet ports designated by the numerals 56 and 58, respectively. These ports open into the annular channel 38 in the casing sections preferably at the central portions thereof but in diametrically opposed relation. It will be understood that in some instances the inlet conduits could be disposed at other circumferentially spaced positions as desired.

The valve body 48 is generally cylindrical as previously mentioned having a diametrically reduced lower portion as at 60 which is received in the lower portion of the opening in the casing and has its bottom surface flush with the bottom surface of the casing as clearly shown in FIGURE 2. The upper portion of the valve body has a radially outwardly directed annular flange 62 which is received in the space 44 between the top flange 36 of the casing and the casing cover plate 42 so as to be retained therein. In order to retain the valve body in rotationally selected positions of adjustment, there is provided a spring leaf detent means 64 secured as by fastener 66 to the underside of the valve body flange 62, and having a downwardly depressed finger portion 68 selectively engaged in one of a series of circumferentially spaced recesses 70 in the top flange 36 of the valve body or in the valve body structure which is adjacent thereto. These recesses are so spaced as to releasably and resiliently retain the valve body in selected rotationally adjusted positions for a purpose to be subsequently set forth.

As will be observed from FIGURE 2, the valve body has a cylindrical radially outwardly projecting portion which fits into the channel 38. A sealing means 72 of rubber or other suitable material in the form of an annulus or ring which is channel-shaped in cross section is provided, this sealing means being disposed over the entire engaging surfaces of the valve body and the casing and shown clearly in FIGURE 2 to provide a fluid-tight seal therebetween. The sealing ring is of course apertured and corresponds with the ports 56 and 58 in order to permit passage of fluid therethrough and into the valve body as set forth hereinafter.

Referring now particularly to FIGURE 3 it will be observed that the valve body is provided with a plurality of inlet passages therein these being indicated by the numerals 74, 76, 78, 80, 82, 84, 86 and 90. Obviously, any desired number of these passagesways may be provided. It will be observed that each passage communicates with a centrally disposed hollow space 92 which constitutes a mixing chamber within the valve body. Thus the exits of each of the inlet passages are continuously in communication with the mixing chamber. The adits or inlet ends of the inlet passages are disposed in circumferentially spaced relation upon the periphery of of the valve body in a position to effect registration thereof with the hot and cold water inlet ports 56 and 58 during rotation of the valve body.

An essential feature of this invention is that each of the inlet passages is of a different water carrying capacity. Various means can be employed to effect the desired variation in the carrying capacity of the passages. As shown, each of the passages extends radially from the axis of rotation of the valve body and is of a uniform cross-sectional area with the cross-sectional area of each passage differing from that of the other passages. Thus, as each passage in turn is caused to selectively register with a hot water or a cold water inlet port, it is evident that varying quantities of the hot or cold water will be admitted to the mixing chamber. Conveniently two of the passages, such as the passages 76 and 86 disposed in opposite alignment with each other are of the same capacity so that an even quantity of hot water from the conduit 52 may be mixed with an even quantity of cold water from the conduit 54. When any other group of the passages, however, are disposed in registration with their ports different proportions of hot and cold water will be admitted to the mixing chamber with the quantity of either hot or cold water admitted being variable from zero to a maximum.

Extending axially downwardly from the valve body and from the center of the mixing chamber is a discharge passage 94 disposed in a depending externally threaded boss 96. This boss is coupled to the upper end of a discharge pipe 98 by means of a swivel connection including the coupling gland 100. The arrangement is such that the discharge conduit 98 may constitute a faucet which is thus swivelly carried by the end of the valve body, or may be a part of any conduit supplying a mixture of hot and cold water to any desired destination.

As shown in FIGURE 3 the adits and exits of the inlet passages of the valve body are so disposed that the passages 76 and 86 are in registration with the inlet ports 56 and 58 of the hot and cold water so that a lukewarm mixture is formed of equal proportions or quantities of the hot and cold water. The mixing chamber being in continuous communication with the discharge conduit 98 thus continuously makes available to that conduit the lukewarm mixture of hot and cold water. When the valve is turned to the position shown in FIGURE 4, it is obvious that both the inlet of the hot and cold water are out of registration with any passage and thus all flow through the device is stopped. With the valve turned to the position shown in FIGURE 5, only the hot water is in communication with the mixing chamber and this communication is through the inlet passage 80. In the reversed position shown in FIGURE 8, it will be observed that only the inlet passage 82 is in registration with the cold water inlet so that only cold water is delivered to the conduit 98. In FIGURES 6 and 7 there are shown other positions in which different proportions of hot and cold water are mixed, that in FIGURE 6 giving a greater proportion of hot water while that in FIGURE 7 giving a greater proportion of cold water.

Obviously, any suitable number of the inlet passages can be provided depending upon the number of general proportions of hot and cold water which it is desired to mix in the device.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A water temperature regulator comprising a generally cylindrical casing having complementary semi-cylindrical relatively movable hollow sections constituting a frame having a cylindrical opening comprising a valve chamber therein, said sections being hingedly connected at one end of each and fastening means releasably securing their other ends in closed position, the interior surface of said sections having a pair of axially spaced annular inwardly projecting flanges with a cylindrical bottom wall therebetween and defining therewith an annular channel, a cylindrical valve body rotatably received in said opening and having an annular cylindrical enlargement rotatably and sealingly engaged in said channel hot and cold water inlet ports each disposed in one of said casing sections and opening into said channel, said valve body having a centrally disposed mixing chamber therein with an axially extending discharge passage communicating said mixing chamber with the exterior of said body and casing, said body having a plurality of inlet passages of different flow capacities each having an exit communicating with said mixing chamber and with the adits of said passages being disposed in circumferentially spaced relation upon the periphery of said cylindrical enlarged portion for selective communication with said hot and cold water inlet ports whereby to vary from zero to a maximum flow of hot and cold water to said mixing chamber.

2. The combination of claim 1 wherein said valve body has a radially outwardly projecting annular flange overlying and rotatably engaging the outer surface of one of said casing flanges and establishing a sealing engagement therewith.

3. The combination of claim 2 including resiliently engageable detent means disposed between said last mentioned flanges and yieldingly retaining said valve body in rotationally adjusted position in said casing.

4. The combination of claim 3 including an axially projecting cylindrical flange on said casing surrounding said body flange, an annular covering plate on said cylindrical flange overlying said valve body flange.

5. The combination of claim 1 wherein said casing and body have a coplanar surface, said body having a projection extending axially from said surface, said discharge passage being provided in said axial projection.

6. The combination of claim 1 wherein said inlet ports are disposed diametrically opposite each other.

7. The combination of claim 1 including sealing means in said casing opening and channel establishing a fluid tight seal between said casing and valve body, said sealing ring comprising a channel-shaped member embracing the periphery and sides of said valve body annular enlargement and having oppositely disposed annular flanges disposed between the periphery of said casing flanges and said valve body.

8. The combination of claim 1 wherein said valve body has an axial projection extending from said opening outwardly of said casing upon the opposite sides thereof from said discharge passage and comprising a finger grip.

References Cited in the file of this patent

UNITED STATES PATENTS

| | | |
|---|---|---|
| 260,073 | Williams | June 27, 1882 |
| 1,251,235 | Johnson | Dec. 25, 1917 |
| 1,333,048 | Webster | Mar. 9, 1920 |
| 1,421,554 | Pohl | July 4, 1922 |
| 1,993,021 | Slaten | Mar. 5, 1935 |
| 2,210,335 | Mueller | Aug. 6, 1940 |
| 2,845,949 | Parker | Aug. 5, 1958 |
| 2,850,041 | Radanof | Sept. 2, 1958 |

FOREIGN PATENTS

| | | |
|---|---|---|
| 146,387 | Switzerland | of 1931 |
| 863,810 | Germany | of 1953 |